(12) United States Patent
Jia et al.

(10) Patent No.: US 7,356,089 B2
(45) Date of Patent: Apr. 8, 2008

(54) PHASE OFFSET SPATIAL MULTIPLEXING

(75) Inventors: Ming Jia, Ottawa (CA); Peiying Zhu, Kanata (CA); Wen Tong, Ottawa (CA); Christian Dubuc, Aylmer (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 761 days.

(21) Appl. No.: 10/655,012

(22) Filed: Sep. 5, 2003

(65) Prior Publication Data

US 2005/0053169 A1    Mar. 10, 2005

(51) Int. Cl.
*H04B 7/02* (2006.01)
*H04L 27/10* (2006.01)
*H04L 23/02* (2006.01)

(52) U.S. Cl. ............... 375/267; 375/261; 375/281
(58) Field of Classification Search ............... 375/267, 375/346, 260, 261, 279, 281, 299, 308, 329, 375/331, 332, 347; 455/500
See application file for complete search history.

(56) References Cited

U.S. PATENT DOCUMENTS

| | | | | |
|---|---|---|---|---|
| 5,345,599 | A * | 9/1994 | Paulraj et al. | 455/500 |
| 5,438,594 | A | 8/1995 | Podolak | |
| 6,097,771 | A * | 8/2000 | Foschini | 375/346 |
| 6,317,466 | B1 * | 11/2001 | Foschini et al. | 375/267 |
| 6,785,341 | B2 * | 8/2004 | Walton et al. | 375/267 |

OTHER PUBLICATIONS

Boutros et al.; "On Random Rotations Diversity and Minimum MSE Decoding of Lattices"; IEEE Trancations on Information Theory; vol. 46, No. 4; Jul. 2000. pp. 1584-1589.*

Paulraj et al.; Space-Frequency Coded Broadband OFDM Systems; IEEE 2000; pp. 1-6.*

Sharma, N. et al., Improved Quasi-Orthogonal Codes Through Constellation Rotation, IEEE Transactions on Communications, vol. 51, No. 3, Mar. 2003 pp. 332-335.

Larsson, Improving the Frame-Error-Rate of Spactial Multiplexing in Block Fading by Randomly Rotating the Signal Constellation, IEEE Communications Letter, vol. 8, No. 8, Aug. 2004, pp. 514-516.

Young et al., Coordinate- Interleaved Space-Time coding with Rotated Constellation, Vehicular Technology Conference, 2003 VTC 2003-Spring, Th 57th IEEE Semiannual vol. 1 Apr. 22-25, 2003 pp. 732-735.

Lucent Technologies; News Release: Chips developed by Bell Labs will enable mobile devices to receive more than 19 megabits of data per second on 3G networks; Oct. 16, 2002.

Lucent Technologies; News Release: BLAST Named "Patent to Watch" by Devon Prutzman; May 20, 2002.

Rohit U. Nabar et al.: Cut-off Rate Based Transmit Optimization for Spatial Multiplexing on General MIMO Channels; 2003.

P.W. Wolniansky et al.: V-BLAST: An Architecture for Realizing Very High Data Rates Over the Rich-Scattering Wireless Channel; Bell Laboratories,Lucent Technologies, NJ; 1998.

Rohit U. Nabar et al.: Transmit Optimization for Spatial Multiplexing in the Presence of Spatial Fading Correlation; 2001.

ETSI standard 300-744.

* cited by examiner

*Primary Examiner*—Don N Vo

(57) ABSTRACT

A rotation by a phase offset is applied to symbols to be transmitted by one antenna relative to symbols to be transmitted from another antenna in a wireless communication system employing multi-element antennas at the transmitter. Such a phase offset allows the functionality of a MIMO system to be maintained when a MIMO channel degenerates. Advantageously, a MIMO system using the new signal design may provide a level of performance in a rich-scattering environment that is equivalent to a MIMO system using a known signal design. Furthermore, a MIMO system employing embodiments of the present invention may show significantly improvements in robustness over conventional MIMO systems.

26 Claims, 10 Drawing Sheets

PHASE OFFSET SPATIAL MULTIPLEXING

FIELD OF THE INVENTION

The present invention relates to wireless communication systems employing multi-element antennas at the transmitter and, more particularly, to providing a phase offset between symbol constellations used by different antennas at the transmitter.

BACKGROUND

In U.S. Pat. Nos. 6,097,771 and 6,317,466, issued to Foschini et al. On Aug. 1, 2000 and Nov. 13, 2001 respectively, it was proposed that the bit rate at which a digital wireless communications system communicates data in scattering environments may be significantly increased. In the disclosed form of spatial multiplexing, an array of multiple antennas is used at both the transmitter and receiver and the channel over which communication occurs is decomposed into m subchannels. In the same frequency band, m one-dimensional signals may be transmitted into a scattering environment. Such an environment makes these m transmitted signals appear, at the receiver antenna array, to be spatially independent. The increased bit rate may be enabled by special receiver processing that maximizes the minimum signal-to-noise ratio of the receiver detection process.

Communication systems that use the technique described in U.S. Pat. No. 6,317,466 are said to use multiple input/multiple output (MIMO) wireless network technology and, more specifically, Bell Labs Layered Space-Time (BLAST) technology.

It is common, in analysis of wireless environments, to describe channels over which the signals are transmitted in a matrix notation. More particularly, a channel may be characterized by an Eigenvalue. (An Eigenvalue of an n by n matrix A is a scalar c such that $A*x=c*x$ holds for some nonzero vector x, where x is an n-tuple.) The foundation on which the realization of high capacity transmission is built for MIMO systems is an environment of parallel non-zero Eigenvalue channels. An environment including such physical propagation channels is a so-called "rich scattering environment". In a rich scattering environment, the signals emitted from the transmit antennas experience a complex propagation (scattering) before arriving at the receiver antennas. In addition, for the MIMO system to function optimally, the propagation paths are required to be statistically uncorrelated. It follows that, if one of these conditions (non-zero Eigenvalue channels, statistically uncorrelated propagation paths) is not satisfied in a practical deployment, a MIMO system may be unable to provide the high capacity transmission promised by the BLAST technology. In this case, the MIMO channel may be considered to have degenerated into a SISO (Single Input Single Output) channel, with only one non-zero Eigenvalue.

A conventional Vertical-BLAST (V-BLAST) system, which is an adaptation of the original BLAST system, may malfunction or fail to work with a degenerated MIMO channel. That is, as the propagation environment improves in respect of noise and interference, accurate communication using a MIMO system may become more difficult.

The requirement of a rich scattering channel for correct MIMO system operation conditions has represented a challenge to MIMO researchers. In particular, effort has been devoted to conducting extensive MIMO channel measurement to prove that for the Personal Communication Services (PCS) cellular telephone frequency band, most of the practical channels may be considered rich scattering environments. However, there are several deployment scenarios where existing MIMO techniques (BLAST, V-BLAST) may not work properly. A first such deployment scenario is one involving a Line-of-sight (LOS) channel, such as is found in fixed wireless communication systems. A second such deployment scenario is one involving MIMO keyholes, which are degenerate channels found in known environments that have particular electromagnetic propagation conditions. A third such deployment scenario involves fully correlated antennas, which arises when there is a space limitation at both the base transceiver station side and the user equipment side.

In the case of LOS channels, solutions that have been proposed involve using "beam forming" or "open loop transmit diversity" to avoid the BLAST limitations. However, these solutions suffer from a large capacity loss. Alternatively, it has been proposed to map the MIMO transmit channel onto two polarization diversity modes. Field measurements have shown that two non-zero Eigenmodes do exist for the two transmit antenna case, even in a near LOS environment. However, such a mapping cannot be easily generalized to cases wherein more than two transmit antennas are used.

Clearly, there is a requirement for an improvement to BLAST so that a MIMO system may function where the environment is not strictly a rich scattering environment.

SUMMARY

Through the use of a new signal design, wherein symbol constellations associated with transmit antennas are rotated by a phase offset relative to one another, the functionality of a MIMO system is maintained when a MIMO channel degenerates. Advantageously, a MIMO system using the new signal design may provide a level of performance in a rich-scattering environment that is equivalent to a MIMO system using a known signal design. Furthermore, the signal design is easy to implement and the implementation may incur no additional cost. Advantageously, a MIMO system employing embodiments of the present invention may show significant improvements in robustness over conventional MIMO systems.

In accordance with an aspect of the present invention there is provided a method of transmitting from a transmitter having a first transmit antenna and a second transmit antenna. The method includes transmitting a first symbol on the first transmit antenna, the first symbol belonging to a first modulation constellation and simultaneously transmitting a second symbol, independent of the first symbol, on the second transmit antenna, the second symbol belonging to a second modulation constellation, the second modulation constellation having a predetermined phase offset from the first modulation constellation.

In accordance with an aspect of the present invention there is provided a transmitter including a first transmit antenna, a second transmit antenna and a transmit processor. The transmit processor is adapted to cause transmission of a first symbol on the first transmit antenna, the first symbol belonging to a first modulation constellation and cause simultaneous transmission of a second symbol, independent of the first symbol, on the second transmit antenna, the second symbol belonging to a second modulation constellation, the second modulation constellation having a predetermined phase offset from the first modulation constellation.

In accordance with an aspect of the present invention there is provided a method of transmitting a stream of data, the stream of data divided into a plurality of bit sequences. The method includes, based on a first bit sequence of the plurality of bit sequences, selecting a first symbol from a modulation constellation and, based on a second bit sequence of the plurality of bit sequences, selecting a second symbol from the modulation constellation. The method further includes rotating the second symbol through a predetermined phase offset to give an offset second symbol, transmitting the first symbol at a first transmit antenna and transmitting the offset second symbol at a second transmit antenna simultaneously with the transmitting the first symbol.

In accordance with an aspect of the present invention there is provided a transmitter including a mapper adapted to, based on a first bit sequence in a stream of data, the stream of data divided into a plurality of bit sequences, select a first symbol from a modulation constellation and, based on a second bit sequence of the plurality of bit sequences, select a second symbol from the modulation constellation. The transmitter further includes a phase adjuster adapted to rotate the second symbol through a predetermined phase offset to give an offset second symbol, a first transmit antenna adapted to transmit the first symbol and a second transmit antenna adapted to transmit the offset second symbol.

In accordance with an aspect of the present invention there is provided a method of receiving a composite signal, where the composite signal includes contributions from a first transmit antenna and a second transmit antenna. The method includes determining an estimate of a first channel experienced by a signal from the first transmit antenna, determining an estimate of a second channel experienced by a signal from the second transmit antenna, rotating the estimate of the second channel through a predetermined phase offset to give an offset estimate of the second channel and decoding the composite signal based on the estimate of the first channel and the offset estimate of the second channel.

In accordance with an aspect of the present invention there is provided a receiver including a channel estimation processor adapted to determine an estimate of a first channel experienced by a signal from a first transmit antenna and determine an estimate of a second channel experienced by a signal from a second transmit antenna. The receiver further includes a phase adjuster adapted to rotate the estimate of the second channel through a predetermined phase offset to give an offset estimate of the second channel and a decoder adapted to decode a composite signal based on the estimate of the first channel and the offset estimate of the second channel, where the composite signal includes contributions from the first transmit antenna and the second transmit antenna.

In accordance with an aspect of the present invention there is provided a method of transmitting from a transmitter having a first transmit antenna and a second transmit antenna. The method includes transmitting a first sequence of symbols on the first transmit antenna, each symbol of the first sequence of symbols belonging to a first modulation constellation and, for each symbol of the first sequence of symbols, simultaneously transmitting a symbol from a second sequence of symbols on the second transmit antenna, the second sequence of symbols independent of the first sequence of symbols and each symbol of the second sequence of symbols belonging to a respective modulation constellation having a respective phase offset from the first modulation constellation.

In accordance with an aspect of the present invention there is provided a transmitter including a first transmit antenna, a second transmit antenna and a transmit processor. The transmit processor is adapted to cause transmission of a first sequence of symbols on the first transmit antenna, each symbol of the first sequence of symbols belonging to a first modulation constellation and, for each symbol of the first sequence of symbols, cause simultaneous transmission of a symbol from a second sequence of symbols on the second transmit antenna, the second sequence of symbols independent of the first sequence of symbols and each symbol of the second sequence of symbols belonging to a respective modulation constellation having a respective phase offset from the first modulation constellation.

In accordance with an aspect of the present invention there is provided a method of transmitting from a transmitter having a first transmit antenna and a second transmit antenna. The method includes transmitting a first symbol on the first transmit antenna, the first symbol belonging to a first modulation constellation and simultaneously transmitting a second symbol, independent of the first symbol, on the second transmit antenna, the second symbol belonging to a second modulation constellation, the second modulation constellation having a random phase offset from the first modulation constellation.

In accordance with an aspect of the present invention there is provided a transmitter including a first transmit antenna, a second transmit antenna and a transmit processor. The transmit processor is adapted to cause transmission of a first symbol on the first transmit antenna, the first symbol belonging to a first modulation constellation and cause simultaneous transmission of a second symbol, independent of the first symbol, on the second transmit antenna, the second symbol belonging to a second modulation constellation, the second modulation constellation having a random phase offset from the first modulation constellation.

In accordance with an aspect of the present invention there is provided a method of transmitting a stream of data, the stream of data divided into a plurality of bit sequences. The method includes, based on a first bit sequence of the plurality of bit sequences, selecting a first symbol from a modulation constellation and, based on a second bit sequence of the plurality of bit sequences, selecting a second symbol from the modulation constellation. The method further includes rotating the second symbol through a random phase offset to give an offset second symbol, transmitting the first symbol at a first transmit antenna and transmitting the offset second symbol at a second transmit antenna simultaneously with the transmitting the first symbol.

In accordance with an aspect of the present invention there is provided a transmitter including a mapper adapted to, based on a first bit sequence in a stream of data, the stream of data divided into a plurality of bit sequences, select a first symbol from a modulation constellation and, based on a second bit sequence of the plurality of bit sequences, select a second symbol from the modulation constellation. The transmitter further includes a phase adjuster adapted to rotate the second symbol through a random phase offset to give an offset second symbol, a first transmit antenna adapted to transmit the first symbol and a second transmit antenna adapted to transmit the offset second symbol.

In accordance with an aspect of the present invention there is provided a transmitter including a mapper adapted to, based on a first bit sequence in a stream of data, the stream of data divided into a plurality of bit sequences, select a first symbol from a first modulation constellation and, based on a second bit sequence of the plurality of bit sequences, select a second symbol, the second symbol belonging to a second modulation constellation, the second modulation constellation having a random phase offset from the first modulation constellation. The transmitter further including a first transmit antenna adapted to transmit the first symbol and a second transmit antenna adapted to transmit the offset second symbol.

In accordance with an aspect of the present invention there is provided a method of receiving a composite signal, where the composite signal includes contributions from a first transmit antenna and a second transmit antenna. The method includes determining an estimate of a first channel experienced by a signal from the first transmit antenna, determining an estimate of a second channel experienced by a signal from the second transmit antenna, rotating the estimate of the second channel through a random phase offset to give an offset estimate of the second channel and decoding the composite signal based on the estimate of the first channel and the offset estimate of the second channel.

In accordance with an aspect of the present invention there is provided a receiver including a channel estimation processor adapted to determine an estimate of a first channel experienced by a signal from a first transmit antenna and determine an estimate of a second channel experienced by a signal from a second transmit antenna. The receiver further includes a phase adjuster adapted to rotate the estimate of the second channel through a random phase offset to give an offset estimate of the second channel and a decoder adapted to decode a composite signal based on the estimate of the first channel and the offset estimate of the second channel, where the composite signal includes contributions from the first transmit antenna and the second transmit antenna.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
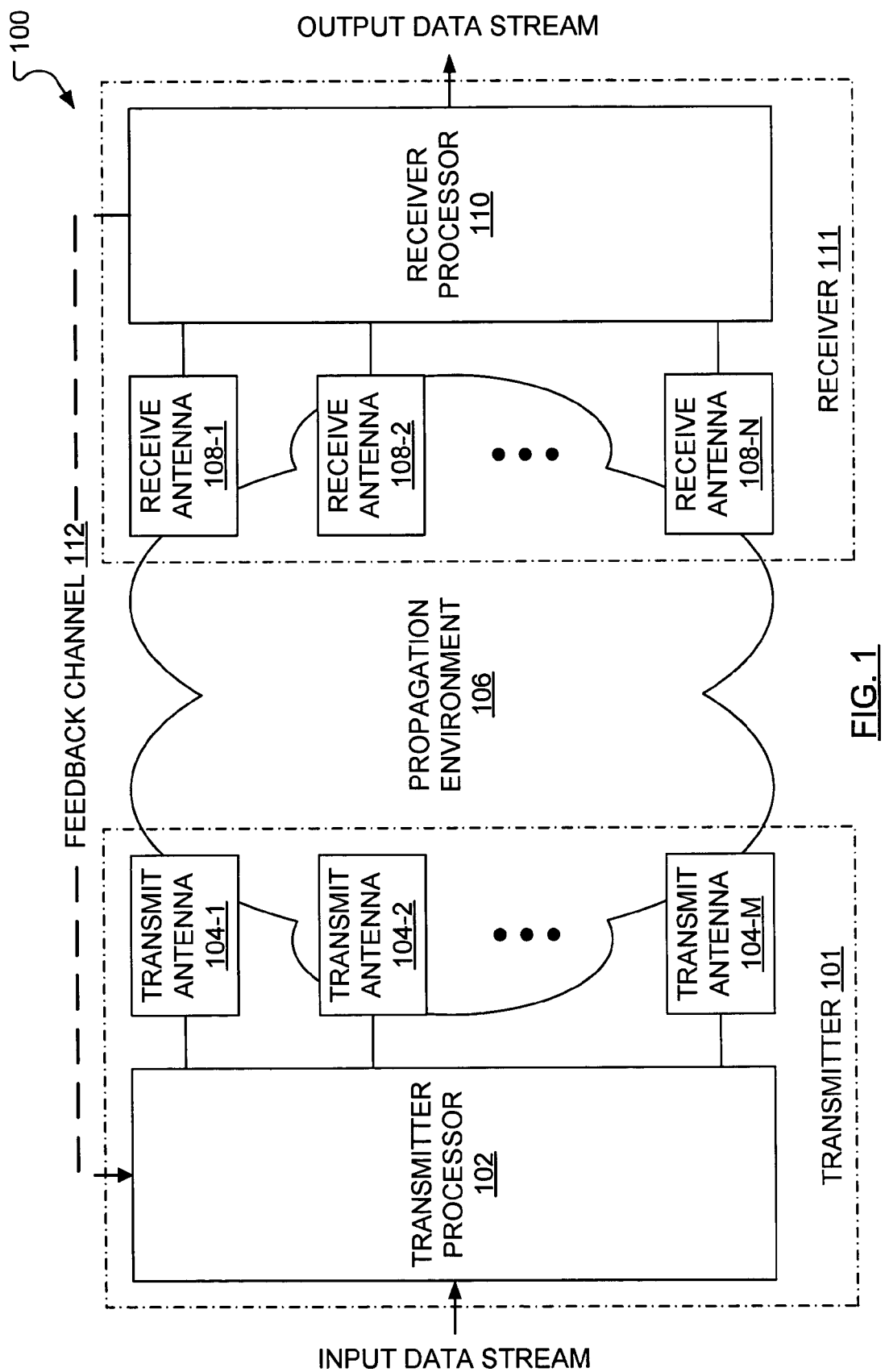
FIG. 1 illustrates an exemplary MIMO system for use with embodiments of the present invention.

FIG. 1 illustrates an exemplary MIMO system 100 that may be adapted to use embodiments of the present invention. The MIMO system 100 includes a transmitter 101 adapted to communicate with a receiver 111 over a propagation environment 106. The transmitter 101 includes a transmitter processor 102 that receives a stream of data and arranges the transmission of signal representative of the data by a set of M transmit antennas 104-1, 104-2, . . . , 104-M (collectively, or individually 104) over the propagation environment 106. The receiver 111 includes a set of N receive antennas 108-1, 108-2, . . . , 108-N (collectively or individually 108) that each receive a composite signal including signals from each of the transmit antennas 104 and pass the composite signal to a receiver processor 110. The output of the receiver processor 110, of the receiver 111, is an estimation of the original data stream.

Although, for simplicity, the following primarily considers communication using a form of Quadrature Amplitude Modulation (QAM) called Quadrature Phase Shift Keying (QPSK), it will be understood that, for higher order QAM, similar conclusions can be reached. In addition, the MIMO system 100 is assumed to have two transmit antennas 104. It will be apparent to a person skilled in the art that embodiments of the present invention may be extended for use by a MIMO system having M transmit antennas 104.

In a conventional V-BLAST communication system, two transmit antennas 104 transmit QPSK signals simultaneously. Each QPSK signal is made up of a series of symbols that may take on one of the four values illustrated in a QPSK constellation 200A in FIG. 2A, wherein each symbol (constellation point) is shown associated with a two-bit sequence. A four bit sequence in a data stream that is to be transmitted may be divided, by the transmitter processor 102, into an odd two-bit sequence and an even two-bit sequence. A symbol representative of the odd two-bit sequence may then be transmitted by one transmit antenna 104-1 at the same instant that a symbol representative of the even two-bit sequence is transmitted by the other transmit antenna 104-2. One of the receive antennas 108 receives, and passes to the receiver processor 110, a composite signal that is representative of a combination of both transmitted symbols, as affected by the propagation environment 106. At the receiver processor 110, the composite signal is decoded to identify the symbols transmitted, and by which transmit antenna 104. Identification of the symbols transmitted provides the two two-bit sequences and the association of a particular transmit antenna 104 with each two-bit sequence allows for the two two-bit sequences to be placed in the correct order such that the original four bit sequence may be properly reconstructed.

In a rich-scattering environment, each propagation channel possesses a complex, random channel response. As such, each transmitted symbol can undergo changes in phase and amplitude. At the receive antenna 108, the composite signal may be seen to take on a symbol from a constellation of 16 points. An exemplary received symbol constellation 300 is illustrated in FIG. 3 for a rich scattering propagation environment, wherein, for example, both transmit antennas have used the symbol constellation 200A of FIG. 2A. In each symbol period, a distinct one of the points in the exemplary received symbol constellation 300 corresponds to the transmission of two particular symbols by the two transmit antennas 104.

Although the received symbol constellation 300 may appear quite random, the receiver processor 110 is generally given a capability to estimate characteristics of the channel over which the received signals arrive. Given an estimation of the MIMO channel, the correspondence between a constellation point in the received symbol constellation 300 and a distinct symbol transmitted by each of the two transmit antennas 104 can be determined. Where the estimation of the MIMO channel is a matrix, the correspondence may be determined through inversion of the MIMO channel matrix.

In an LOS propagation environment, each propagation channel possesses an (almost) identical channel response. At the receive antenna 108, the composite signal may be seen to take on a symbol from a constellation of only nine points. For instance, a composite signal constellation point formed by the combination of a first symbol (say, 01) received from the first transmit antenna 104-1 and a second symbol received (say, 00) from the second transmit antenna 104-2 may be indistinguishable from a composite signal constellation point formed by the combination of the second symbol (00) received from the first transmit antenna 104-1 and the first symbol (01) received from the second transmit antenna 104-2. In the LOS propagation environment, a signal is typically only deteriorated by additive white Gaussian noise (AWGN). The channel matrix in such a propagation environment has identical elements, hence an inverse matrix does not exist. As such, it is often not possible to retrieve and identify the transmitted information at the receiver processor 110.

In overview, it is proposed that one of the transmit antennas 104 use symbols from a new constellation that is equivalent to the constellation in use by the other transmit antenna 104 after a phase offset rotation.

Figure 2B:
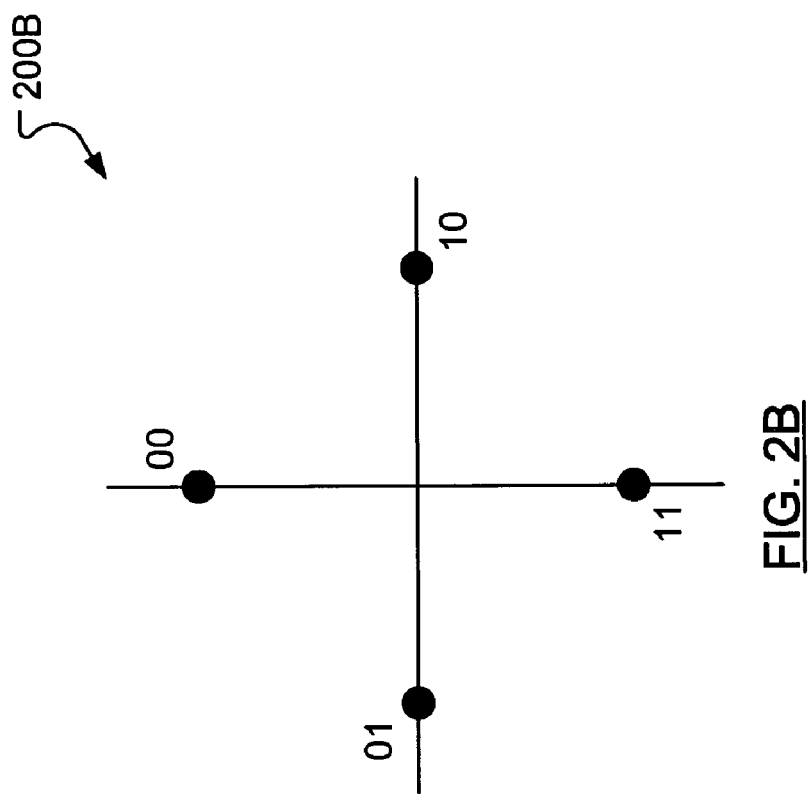
FIG. 2B illustrates the symbol constellation of FIG. 2A after a rotation by a phase offset of 45 degrees.
Figure 2A:
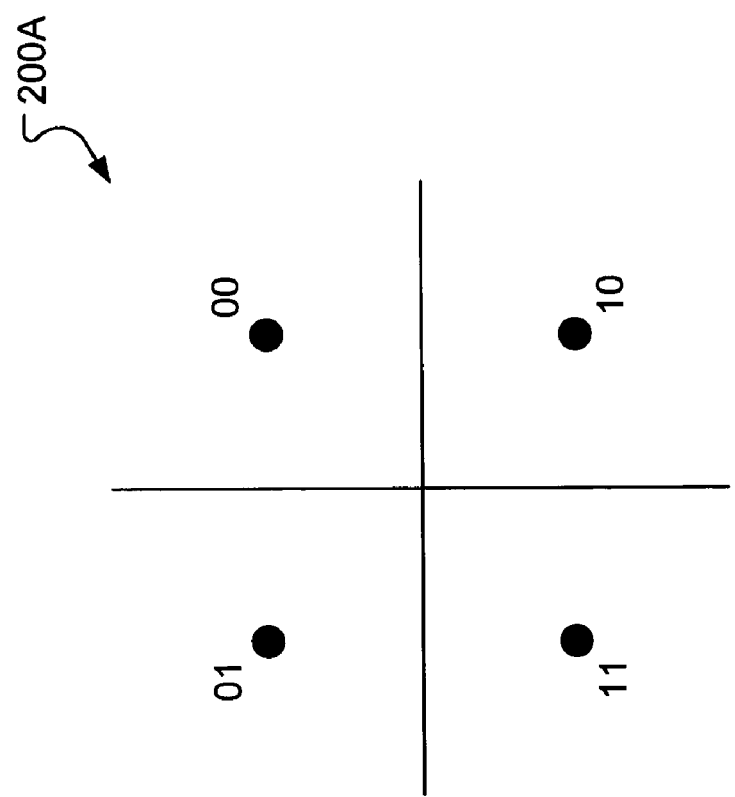
FIG. 2A illustrates a conventional symbol constellation for Quadrature Phase Shift Keying.
Figure 3:
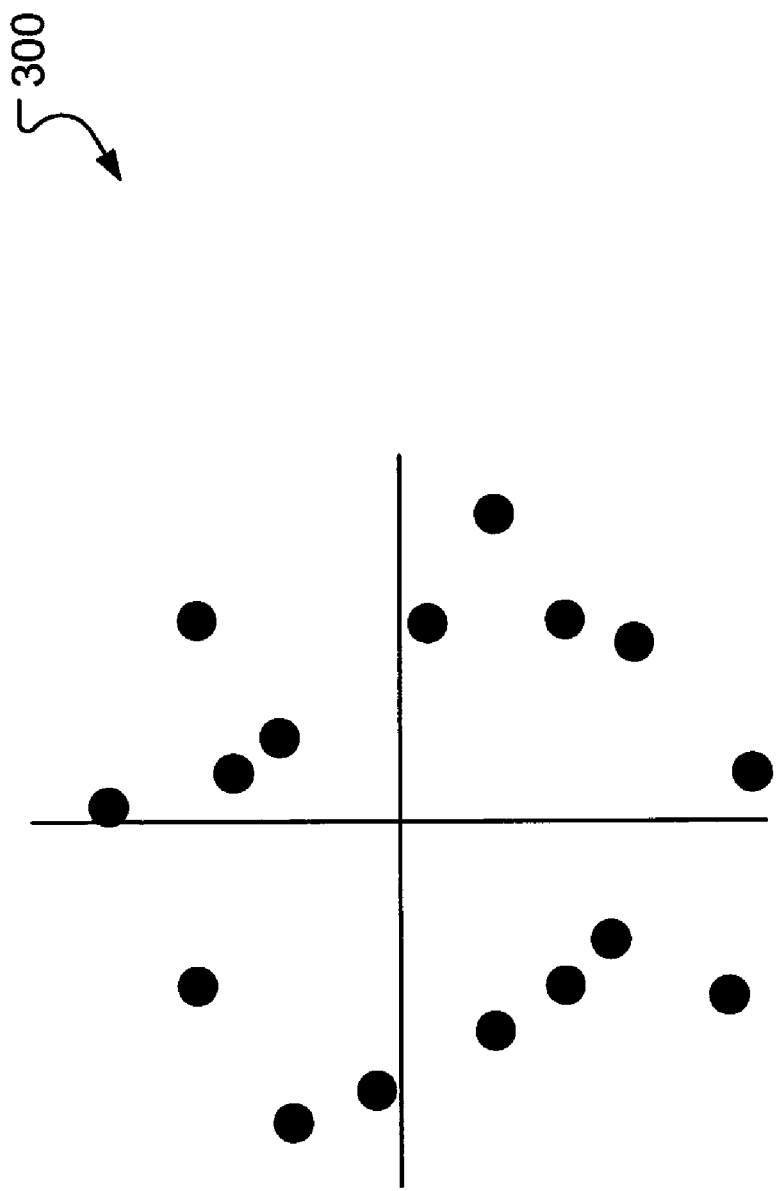
FIG. 3 illustrates an exemplary received symbol constellation for a rich scattering propagation environment.
Figure 4:
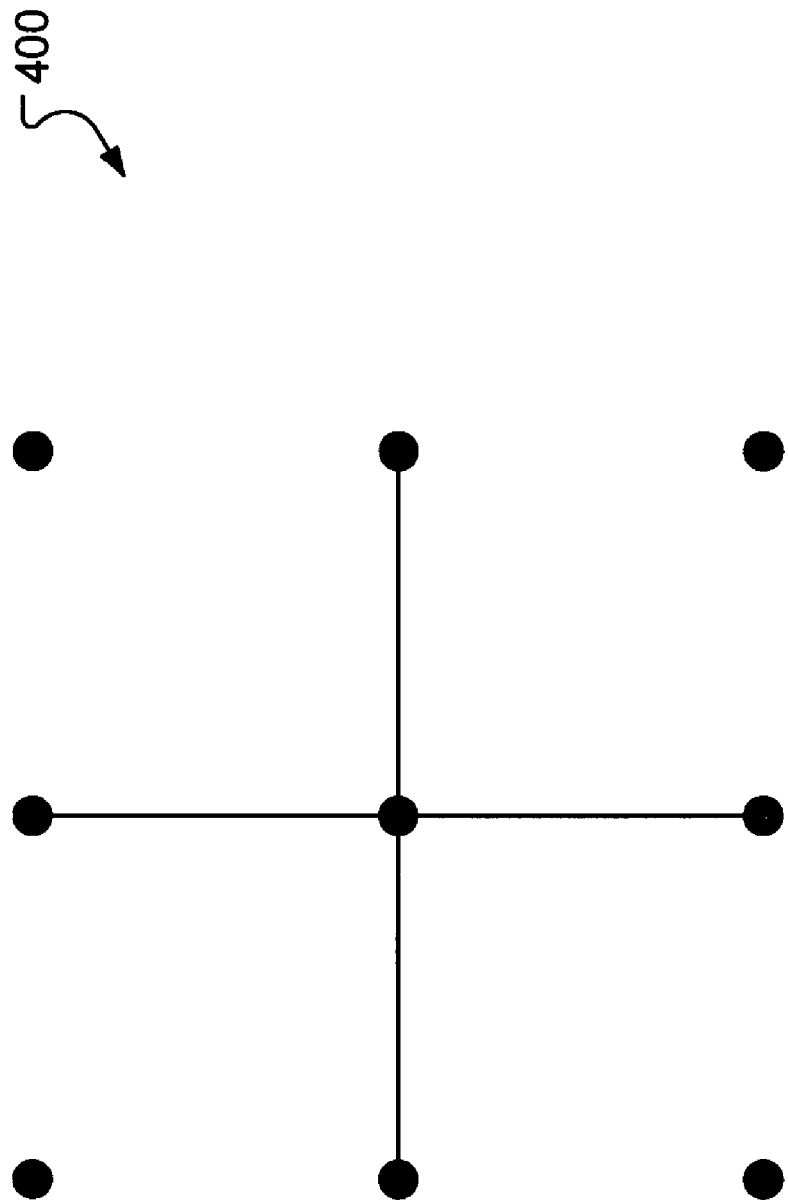
FIG. 4 illustrates a composite constellation formed for the conventional V-BLAST signal design where the propagation environment is an LOS environment.

FIG. 4 illustrates a composite constellation 400 formed for the conventional V-BLAST signal design (i.e., both transmit antennas 104 have used symbols from the symbol constellation 200A of FIG. 2A) where the propagation environment 106 is an LOS environment.

Figure 5:
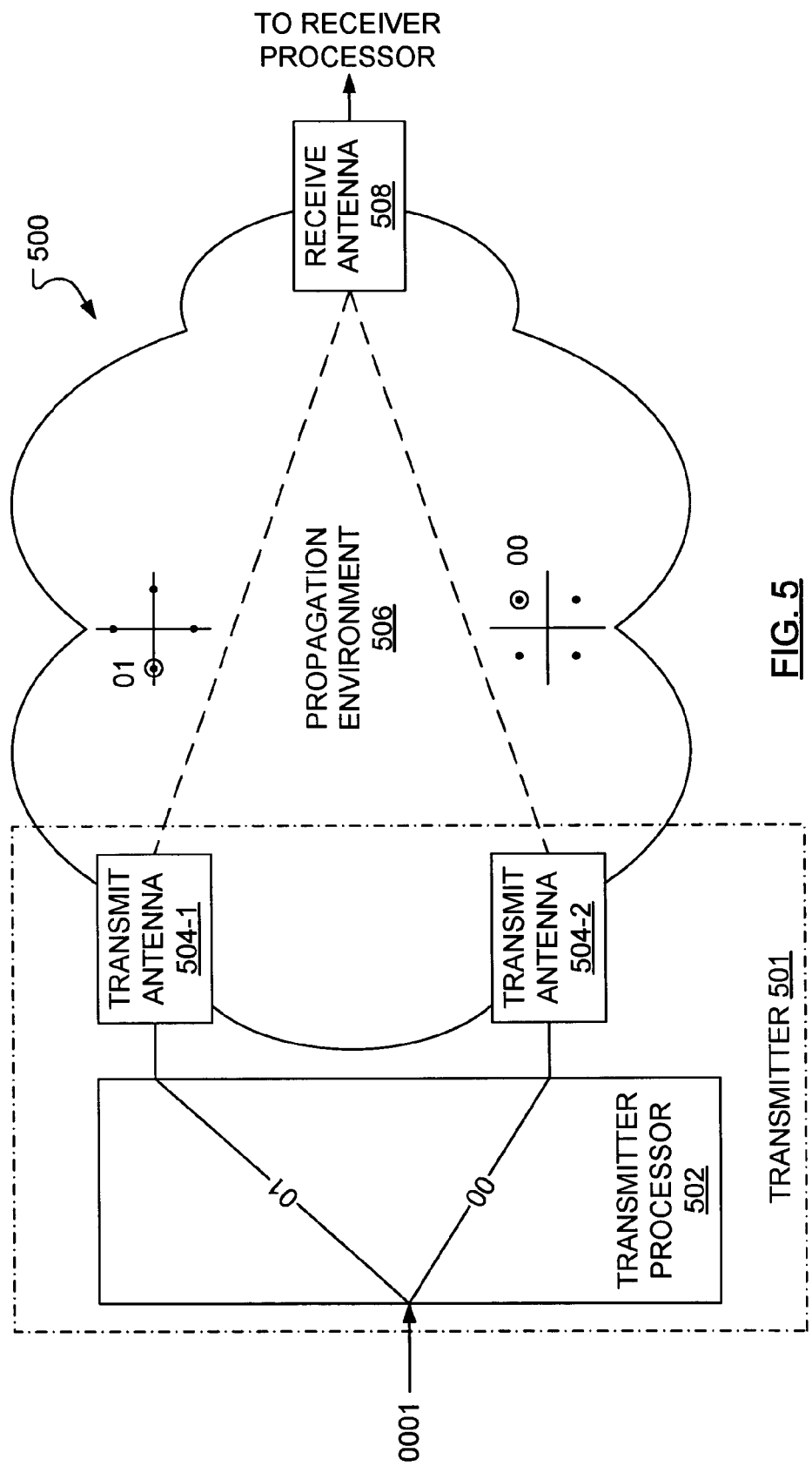
FIG. 5 illustrates a partial MIMO system transmitting symbols according to an embodiment of the present invention.
Figure 6:
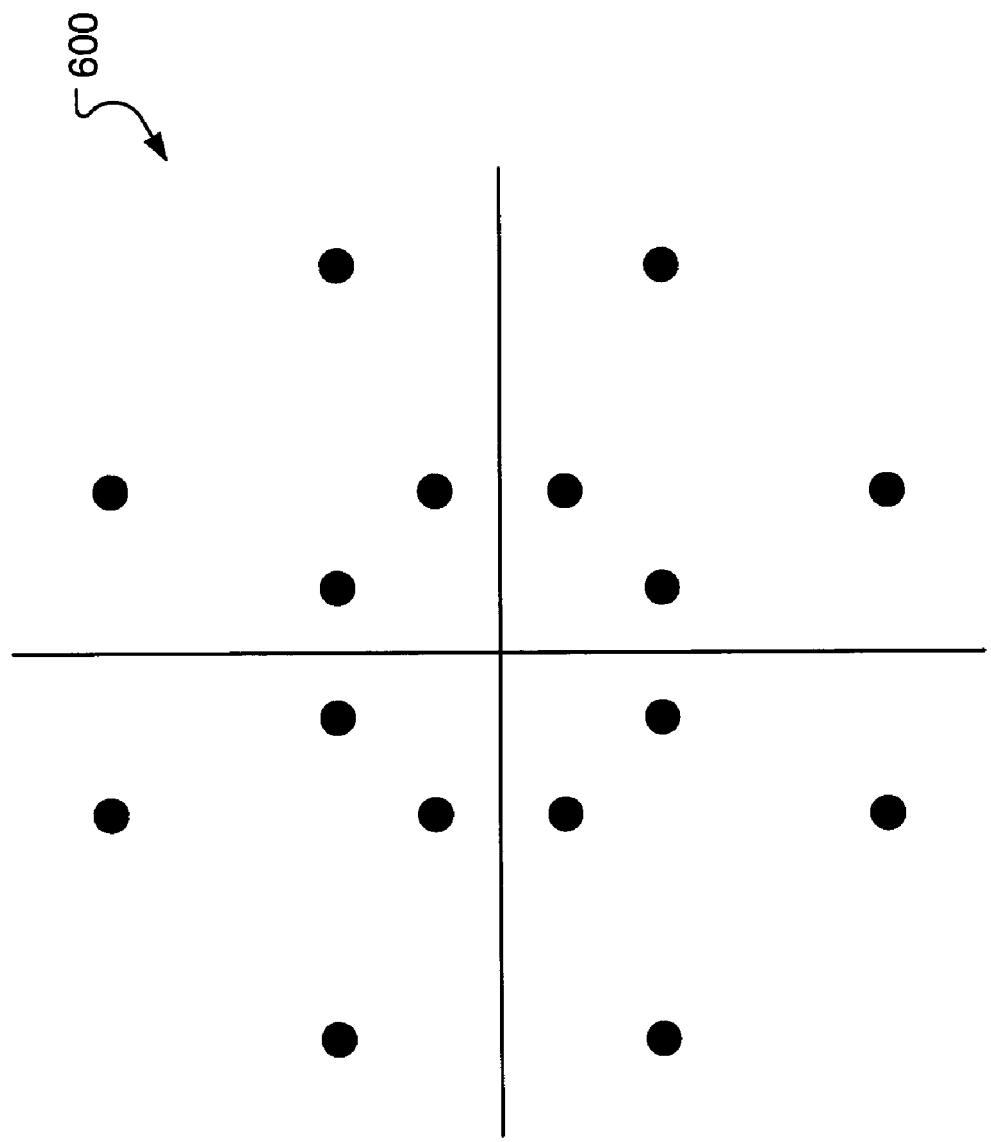
FIG. 6 illustrates a composite constellation formed for a signal design according to an embodiment of the present invention, where the propagation environment is an LOS environment.

A portion 500 of a two-antenna MIMO system is illustrated in FIG. 5. In particular transmitter 501 is shown to include a transmitter processor 502, a first transmit antenna 504-1 and a second transmit antenna 504-2. The signals transmitted by the transmitter 501 may be received, after travelling through a propagation environment 506, by multiple receive antennas, however, only a single receive antenna 508 is illustrated. In one embodiment of the invention, the first transmit antenna 504-1 uses symbols from the new constellation 200B (FIG. 2B) that is equivalent to the constellation 200A (FIG. 2A) that is in use by the second transmit antenna 504-2, after a rotation by a phase offset of 45 degrees. This results in a new composite constellation 600, as illustrated in FIG. 6. The new composite constellation 600 is formed of symbols that may be received at a receive antenna 108 of the partial MIMO system 500 wherein the propagation environment 506 is an LOS environment.

In contrast to the composite constellation 400 (FIG. 4) formed for the conventional V-BLAST signal design where the propagation environment 106 is an LOS environment, the new composite constellation 600 (FIG. 6) for the new signal design provides the receiver processor 110 with the information required to fully recover the transmitted data. This recovery is possible because the receiver processor 110 can distinguish between the 16 distinct composite constellation points, i.e., each of the 16 possible symbol combinations results in a unique constellation point. By associating a received signal with a constellation point in the new composite constellation 600, the receiver processor 110 may associate one of the four QPSK symbols with each of the two transmit antennas 104.

It can be shown that, in rich-scattering environments, with no channel correlation between the transmit antennas, MIMO systems employing this new signal design have the same performance as MIMO systems employing the conventional V-BLAST signal design. However, when the channel condition deteriorates, MIMO systems employing this new signal design provide a performance improvement over MIMO systems employing the conventional V-BLAST signal design. For the LOS environment, it can be shown that this performance improvement can be very significant.

Where the symbol transmitted by one of the transmit antennas 104 is selected from a signal constellation that is offset by 45 degrees from the signal constellation from which symbols are selected at the other transmit antenna 104, the new signal design differs from conventional V-BLAST in that, to properly decode a signal received at a receive antenna 108 into particular symbols related to particular antennas, the receiver processor 110 may be required to have an awareness of which of the two transmit antennas uses the offset constellation. Such an awareness may be provided through the conventional use of a feedback channel 112 from the receiver processor 110 to the transmitter processor 102. In conventional V-BLAST, the feedback channel 112 may be employed to achieve optimum power allocation. However, the feedback channel 112 is not a necessity.

As is common, the original data stream may be processed into Forward Error Correction (FEC) blocks. FEC is a system of error control for data transmission wherein the receiving device has the capability to detect and correct a code block that contains fewer than a predetermined number of symbols in error. FEC is accomplished by adding bits to each transmitted character or code block using a predetermined algorithm.

Where the original data stream is processed into FEC blocks, the receiver processor 110, at power-on time, can decode the received signal twice for the first FEC block. The receiver processor 110 can thus determine that the transmitter is using a phase offset between transmit antennas 104 and can determine a more likely association of transmit antenna 104 with offset symbol constellation.

As alluded to earlier, the new signal design may be extended beyond the two transmit antenna case and beyond QPSK to higher order QAM signaling schemes. In one embodiment, in the case of M transmit antennas 104, the first antenna 104-1 transmits symbols from the conventional QAM constellation, the second antenna 104-2 simultaneously transmits symbols from the conventional QAM constellation with a delta degree phase offset relative to the QAM constellation transmitted at the first antenna, a third antenna simultaneously transmits symbols from the conventional QAM constellation with a delta degree phase offset relative to the QAM constellation transmitted at the second antenna, . . . and an Mth antenna 104-M simultaneously transmits symbols from the conventional QAM constellation with a delta degree phase offset relative to the QAM constellation transmitted at the M-1th antenna, where the delta degree phase offset is 90/M degrees.

It has been determined that a constant phase offset (rotation) adaptation of the V-BLAST system improves performance of a MIMO system for channels characterized by Rician fading. However, for channels characterized by Rayleigh fading or frequency-selective channels, the performance may not be improved.

In another embodiment, instead of the constant 45 degree phase offset, the phase offset is varied with every symbol period according to a predetermined progression. For instance, in a time-varying phase offset scheme, for a first symbol period, the second antenna 104-2 may transmit a symbol selected from a constellation rotated 45 degrees relative to the constellation of the first antenna 104-1, for a second symbol period, the second antenna 104-2 may transmit a symbol selected from a constellation rotated 135 degrees relative to the constellation of the first antenna 104-1, for a third symbol period, the second antenna 104-2 may transmit a symbol selected from a constellation rotated 225 degrees relative to the constellation of the first antenna 104-1 and for a fourth symbol period, the second antenna 104-2 may transmit a symbol selected from a constellation rotated 315 degrees relative to the constellation of the first antenna 104-1.

Notably, the predetermined progression may be deterministic, i.e., 45, 135, 225, 315, 45, 135, 225, 315, . . . , or seemingly random, 135, 225, 225, 45, 225, 315, 315, 315, . . . , and the receiver is aware of the predetermined progression.

Potentially advantageous features of the time-varying phase offset scheme include an increase in "bit stream diversity" and the addition of the "phase sweeping diversity" to conventional BLAST. Bit stream diversity relates to the aspect of the time-varying phase offset scheme wherein the same bit sequence at the input to the transmitter will often result in different symbols being transmitted at the two antennas, dependent upon the point in the predetermined progression. Phase sweeping diversity relates to the aspect of the time-varying phase offset scheme wherein the symbols transmitted at the two antennas (even though they are independent) add constructive and thereby mitigate the effect of some fading environments.

In another embodiment, as an alternative to a predetermined progression of phase offset, a time-varying phase offset scheme may be controlled by the receiver processor 110 via the feedback channel 112. In the simplest implementation, a single bit from the receiver processor 110 is used by the transmitter processor 102 to determine whether to offset the standard symbol constellation by a predetermined amount in the positive (clockwise) or negative (counterclockwise) direction.

Where the use of a constant, or predictably time variable, phase offset has limitations outlined hereinbefore, these limitations may be overcome by, instead, randomizing the phase offset. The randomizing of the phase offset may be arranged to uniformly distribute the phase offset over the course of an FEC block. Advantageously, the randomness need not be reconstructed at the receiver. However, a random phase offset is applied to the estimated channel. Consequently, the channel appears to have a random phase component, even in an LOS environment, and the symbols transmitted by each antenna may be determined.

To the receiver processor 110, the received signal appears to have been transmitted over a channel with a phase that has a random frequency response. Additionally, such a signal design does not require the feedback channel 112.

Figure 7:
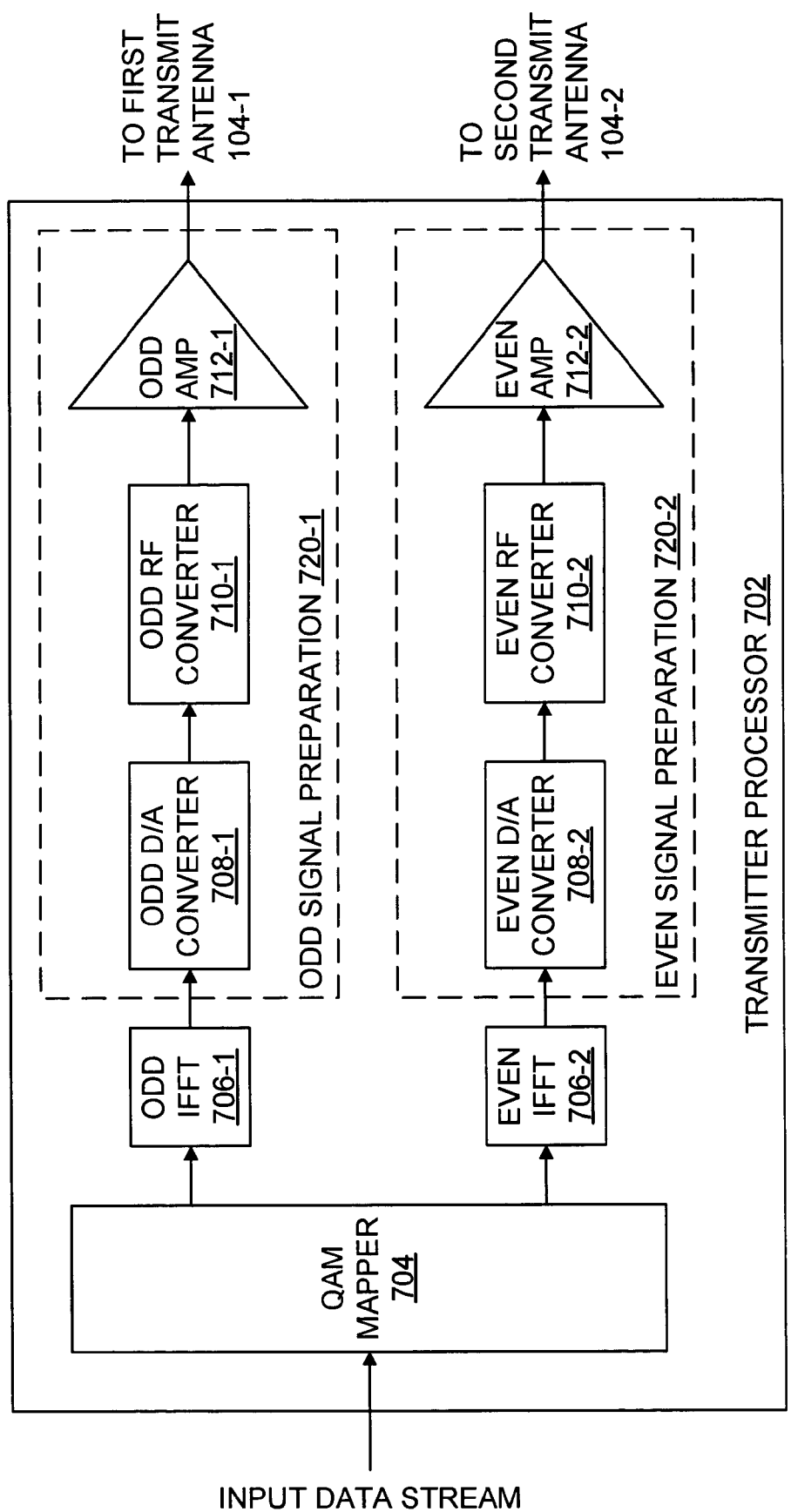
FIG. 7 illustrates an exemplary transmitter processor for a known Orthogonal Frequency Division Multiplexing MIMO system.

FIG. 7 illustrates a transmitter processor 702 for a known Orthogonal Frequency Division Multiplexing (OFDM) MIMO system, where the rest of the OFDM MIMO system may appear as illustrated in FIG. 1. Data to be transmitted is received at a QAM mapper 704. This data is coded and modulated by the QAM mapper 704 and QAM symbols are produced as an output odd symbol and an output even symbol. The odd and even output symbols may then be sent as inputs to an odd Inverse Fast Fourier Transformer (IFFT) 706-1 and an even IFFT 706-2 (individually or collectively 706), respectively. Each IFFT 706 processes the output symbols (plus pilot signals to be discussed hereinafter) that are organized in frequency space (i.e., represented by sub-carriers) and transforms these into a time sequence of samples that represent the composite base-band signal to be transmitted for the symbol interval.

The output time sequence from the odd IFFT 706-1 is sent as input to an odd signal preparation block 720-1 from which a signal is emitted that is subsequently transmitted by the first transmit antenna 104-1. In particular, in the odd signal preparation block 720-1, the output time sequence from the odd IFFT 706-1 is first converted to analog format by an odd digital to analog (D/A) converter 708-1, then converted to the appropriate radio frequency for the assigned channel by an odd RF converter 710-1 and then amplified to a suitable level by an odd amplifier 712-1. In many cases, the RF conversion process performed by the odd RF converter 710-1 and the odd amplifier 712-1 also involves some filtering to confine the signals to the assigned channel.

Similarly, the output time sequence from the even IFFT 706-2 is sent as input to an even signal preparation block 720-2 from which a signal is emitted that is subsequently transmitted by the second transmit antenna 104-2. In particular, in the even signal preparation block 720-2, the output time sequence from the even IFFT 706-2 is first converted to analog format by an even digital to analog (D/A) converter 708-2, then converted to the appropriate radio frequency for the assigned channel by an even RF converter 710-2 and then amplified to a suitable level by an even amplifier 712-2.

Figure 8:
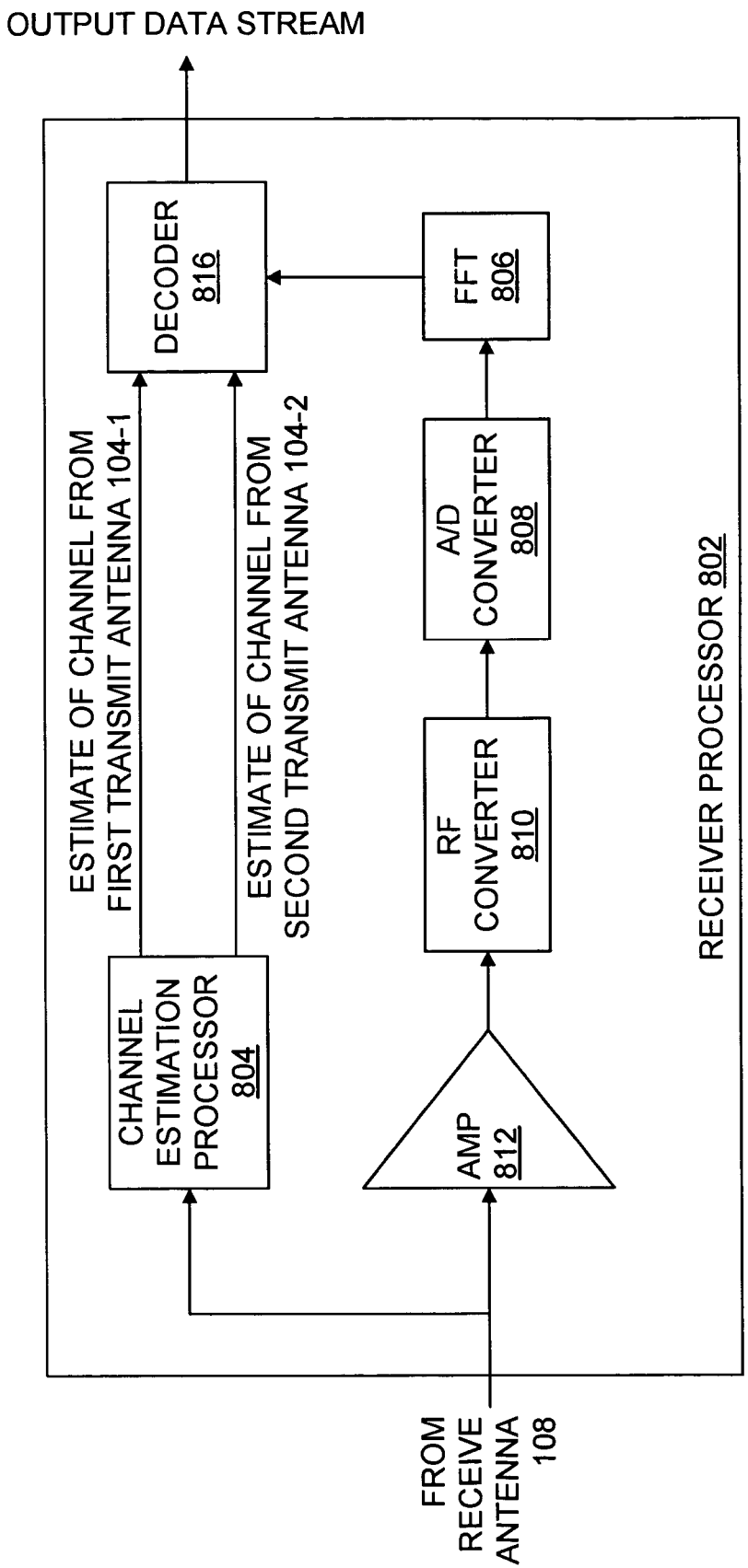
FIG. 8 illustrates an exemplary receiver processor for a known Orthogonal Frequency Division Multiplexing MIMO system.

FIG. 8 illustrates a receiver processor 802 for the known OFDM MIMO system of which the transmitter processor 702 of FIG. 7 is a component. For the purposes of this example, consider that signals are received for the receiver processor 802 at one of the receive antennas 108.

As the full transmission signal may occupy a significant bandwidth, such as 5 MHz, the channel effects on the sub-carriers may be different in different parts of the OFDM channel. For example, the channel may be logically divided into 30 sub-carriers, numbered 1-30. In operation, sub-carriers 2 and 4 may be affected by the channel differently than channels 20 and 30. On the other hand, sub-carriers 1, 3 and 5 may be expected to be affected by the channel in a similar way to sub-carriers 2 and 4. By introducing a sufficient number of pilot signals on pilot sub-carriers suitably distributed across the channel, the effects of the channel may be determined for nearby sub-carriers. For example, with pilot signals available in sub-carriers 20 and 30, the effect on the sub-carriers in-between (21-29) may be estimated by a linear interpolation from the measurements of the pilot signals in sub-carriers 20 and 30. For the mobile radio channel, it has been found that using about 10% of the sub-carriers for pilot signals provides sufficient resolution to estimate the channel without an undue loss of capacity (as the pilot sub-carriers are not available to carry user payload data). A suitable number and distribution of pilot sub-carriers is shown in the Digital Video Broadcasting (DVB) Standard found in European Telecommunications Standards Institute (ETSI) standard EN 300-744 (hereby incorporated herein by reference). Chapter five of Richard van Nee and Ramjee Prasad, "OFDM for Wireless Multimedia Communications", Artech House publishers 2000, ISBN0-89006-530-6 also discusses the principles of channel estimation for Orthogonal Frequency Division Multiplexing (OFDM) radio systems.

At the input to the receiver processor 802, the received signal is split such that traffic-carrying sub-carriers are sent to a receive amplifier 812 and pilot sub-carriers are sent to a channel estimation processor 804. Signals on the pilot sub-carriers are compared with expected signals in a channel estimation processor 804 to estimate phase and amplitude perturbations that may have occurred as the received signal passed over all the channels associated with the two transmit antennas 104. The output of the channel estimation processor 804 is an estimate of the channels experienced by signals on sub-carriers transmitted from the first transmit antenna 104-1 and an estimate of the channels experienced by signals on sub-carriers transmitted from the second transmit antenna 104-2.

The output of the receive amplifier 812 is received at a receive RF converter 810 that removes the RF component of the signal. The analog signal at the output of the receive RF converter 810 is converted to a digital signal by an analog to digital (A/D) converter 808. The digital version of the received signal is then passed to a Fast Fourier Transform (FFT) 806 to extract the information available in the Fourier transform of the signal. This information is passed to a decoder 816 that also receives the estimates of the channels for the two transmit antennas 104. The decoder 816 uses the information from the FFT 806 in combination with the channel estimates to determine, for each symbol period and for each sub-carrier, which two particular symbols were transmitted by which of the two transmit antennas 104.

Figure 9:
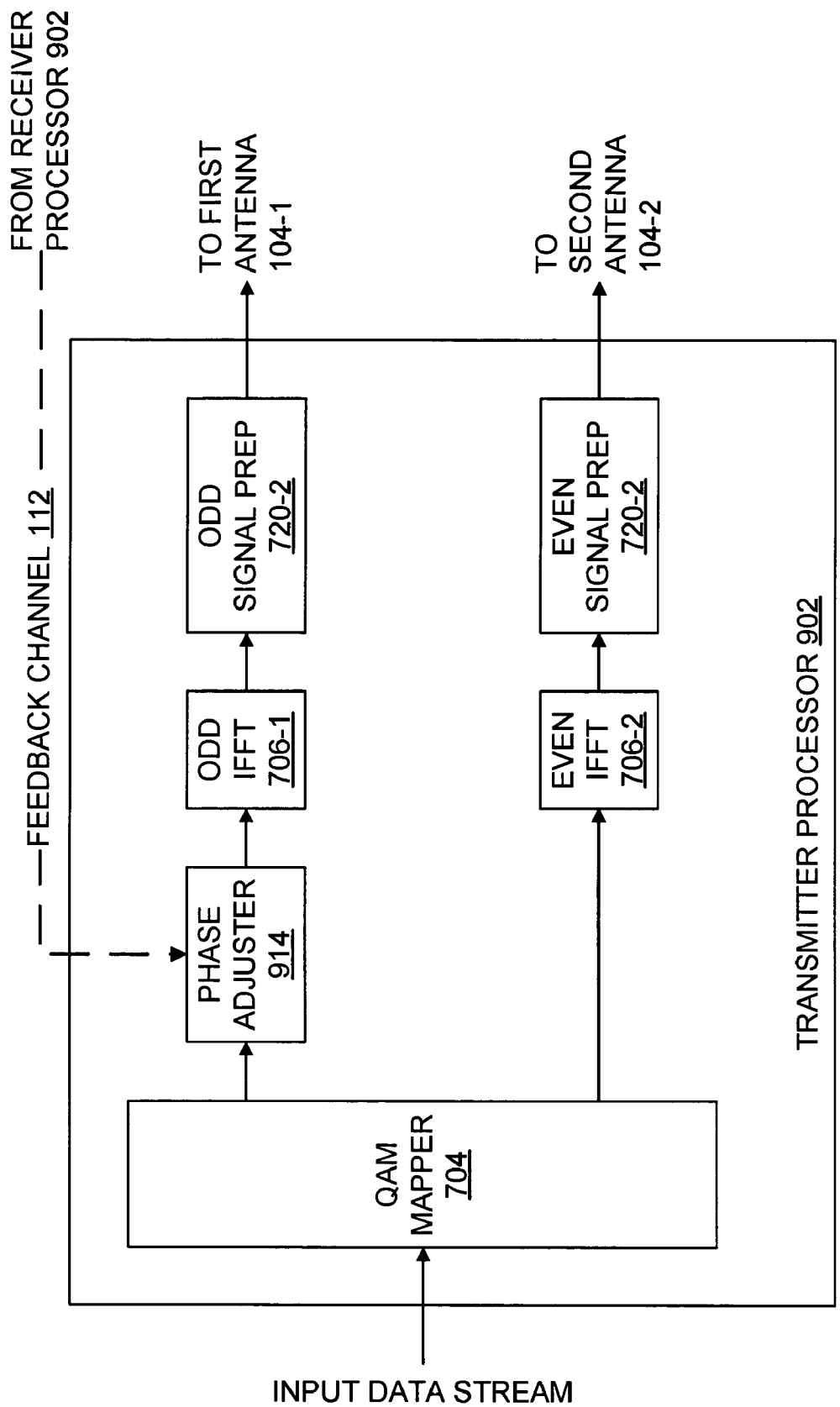
FIG. 9 illustrates an adaptation of the transmitter processor of FIG. 7 according to an embodiment of the present invention.

FIG. 9 introduces a transmitter processor 902 that adapts the transmitter processor 702 of FIG. 7 to use an offset symbol constellation in combination with a normal constellation. In particular, a phase adjuster 914 is inserted between the QAM mapper 704 and the odd IFFT 706-1 to adjust the phase of the symbol output from the QAM mapper 704 destined for the first transmit antenna 104-1. The phase adjuster may be arranged to adjust the phase of the symbol received from the QAM mapper 704 by a predetermined amount, say 45 degrees, as discussed hereinbefore. Equally, the phase adjuster may be arranged to adjust the phase of the symbol received from the QAM mapper 704 by a random amount, or a time-varying amount, also as discussed hereinbefore.

Figure 10:
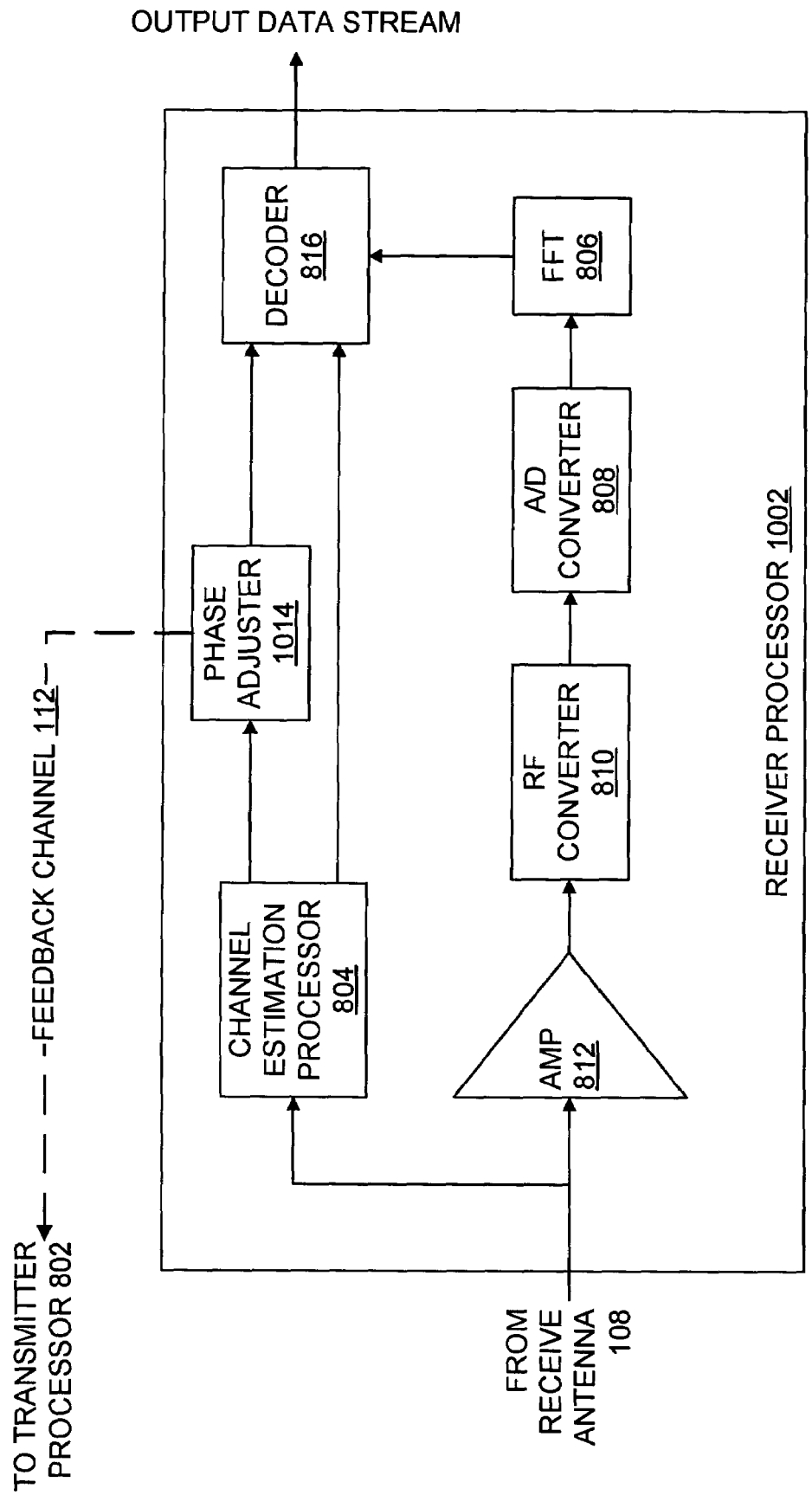
FIG. 10 illustrates an adaptation of the receiver processor of FIG. 8 according to an embodiment of the present invention.

Illustrated in FIG. 10 is a receiver processor 1002 for use in a MIMO system in conjunction with the transmitter processor 902 of FIG. 9. The receiver processor 1002 of FIG. 10 adapts the receiver processor 802 of FIG. 8 to receive signals sent using a normal constellation and an offset symbol constellation. In particular, a phase adjuster 1014 is inserted between the channel estimation processor 804 and the decoder 816 to adjust (i.e., rotate through a phase offset) the phase of the channel estimate output from the channel estimation processor 804. The phase adjuster 1014 of FIG. 10 should be arranged to adjust the phase of the estimate of the channel experienced by signals on sub-carriers transmitted from the first transmit antenna 104-1 in the same manner that the phase adjuster 914 of FIG. 9 has been arranged to adjust the phase of the symbol constellation. That is, either a constant, time-varying or random phase offset may be introduced by the phase adjuster 1014.

In some of the phase offset constellation embodiments described hereinbefore, there is a requirement that the transmitter processor 902 communicate with the receiver processor 1002. As illustrated in FIG. 1, and again in FIGS. 9 and 10, the feedback channel 112 may conventionally be provided for such communication.

In the receiver processor controlled time-varying phase offset scheme described hereinbefore, the receiver processor 110 transmits a single bit per symbol interval, via the feedback channel 112, to indicate whether to offset the standard symbol constellation by a predetermined amount in the positive (clockwise) or negative (counterclockwise) direction.

Advantageously, where a random phase offset is introduced at both the transmitter processor 902 and the receiver processor 1002, the feedback channel 112 is unnecessary. Additionally, it has been recognized that with a given, fixed phase offset between constellations and high-order QAM in the LOS propagation environment, the minimum distance between points in the received constellation can be quite small. A small minimum distance between such constellation points can lead to ambiguity when decoding and, thus, errors. However, for random phase offset and the same order QAM in the LOS propagation environment, the minimum distance between received constellation points changes for every symbol period. As such, there may be randomly selected phase offsets that lead to smaller minimum distances than the fixed phase offset case but, on average, the minimum distance between received constellation points in the random phase offset case may be shown to be greater than in the fixed phase offset case.

On channels characterized by flat (or quasi-flat) fading, it may be shown that selecting a fixed phase offset scheme may result in errors that occur in bursts. In contrast, selecting a random phase offset scheme may result in errors that occur in at the same or similar rate, but that are spread out among several error correction coding blocks. As the errors are spread out in the random phase offset scheme, the errors are more likely to be corrected by the error correction system.

In review, in a two antenna transmitter in an OFDM MIMO system, for a given sub-carrier, there may be introduced a phase offset between symbol constellations used to select symbols for transmission on the first antenna and the second antenna, where the phase offset may be fixed, sequentially varying or random.

Other modifications will be apparent to those skilled in the art and, therefore, the invention is defined in the claims.

We claim:

1. A method of transmitting from a transmitter over a propagation environment, said transmitter having a first transmit antenna and a second transmit antenna, said method comprising:

transmitting a first symbol on said first transmit antenna, said first symbol belonging to a first modulation constellation; and simultaneously transmitting a second symbol, independent of said first symbol, on said second transmit antenna, said second symbol belonging to a second modulation constellation, said second modulation constellation having a phase offset from said first modulation constellation, said phase offset being determined independently of said propagation environment.

2. The method of claim 1 wherein each of said first modulation constellation and said second modulation constellation is based on a Quadrature Phase Shift Keying modulation scheme.

3. The method of claim 2 wherein said phase offset is 45 degrees.

4. The method of claim 1 wherein said transmitting said first symbol and said transmitting said second symbol are performed for a given sub-carrier in an Orthogonal Frequency Division Multiplexing channel.

5. A transmitter in a propagation environment comprising:
a first transmit antenna;
a second transmit antenna; and
a transmit processor adapted to:
cause transmission of a first symbol on said first transmit antenna, said first symbol belonging to a first modulation constellation; and
cause simultaneous transmission of a second symbol, independent of said first symbol, on said second transmit antenna, said second symbol belonging to a second modulation constellation, said second modulation constellation having a phase offset from said first modulation constellation, said phase offset being determined independently of said propagation environment.

6. A method of transmitting a stream of data over a propagation environment, said stream of data divided into a plurality of bit sequences, said method comprising:
based on a first bit sequence of said plurality of bit sequences, selecting a first symbol from a modulation constellation;
based on a second bit sequence of said plurality of bit sequences, selecting a second symbol from said modulation constellation;
rotating said second symbol through a phase offset to give an offset second symbol, said phase offset being determined independently of said propagation environment;
transmitting said first symbol at a first transmit antenna; and
transmitting said offset second symbol at a second transmit antenna simultaneously with said transmitting said first symbol.

7. A transmitter in a propagation environment comprising:
a mapper adapted to:
based on a first bit sequence in a stream of data, said stream of data divided into a plurality of bit sequences, select a first symbol from a modulation constellation;
based on a second bit sequence of said plurality of bit sequences, select a second symbol from said modulation constellation;
a phase adjuster adapted to rotate said second symbol through a phase offset to give an offset second symbol, said phase offset being determined independently of said propagation environment;
a first transmit antenna adapted to transmit said first symbol; and
a second transmit antenna adapted to transmit said offset second symbol.

8. A method of receiving a composite signal over a propagation environment, where said composite signal includes contributions from a first transmit antenna and a second transmit antenna, said method comprising:
determining an estimate of a first channel experienced by a signal from said first transmit antenna;
determining an estimate of a second channel experienced by a signal from said second transmit antenna;
rotating said estimate of said second channel through a phase offset to give an offset estimate of said second channel, said phase offset being determined independently of said propagation environment; and
decoding said composite signal based on said estimate of said first channel and said offset estimate of said second channel.

9. A receiver in a propagation environment comprising:
a channel estimation processor adapted to:
determine an estimate of a first channel experienced by a signal from a first transmit antenna;
determine an estimate of a second channel experienced by a signal from a second transmit antenna;
a phase adjuster adapted to rotate said estimate of said second channel through a phase offset to give an offset estimate of said second channel, said phase offset being determined independently of said propagation environment; and
a decoder adapted to decode a composite signal based on said estimate of said first channel and said offset estimate of said second channel, where said composite signal includes contributions from said first transmit antenna and said second transmit antenna.

10. A method of transmitting from a transmitter over a propagation environment, said transmitter having a first transmit antenna and a second transmit antenna, said method comprising:
transmitting a first sequence of symbols on said first transmit antenna, each symbol of said first sequence of symbols belonging to a first modulation constellation; and,
for each symbol of said first sequence of symbols,
simultaneously transmitting a symbol from a second sequence of symbols on said second transmit antenna, said second sequence of symbols independent of said first sequence of symbols and each symbol of said second sequence of symbols belonging to a respective modulation constellation having a respective phase offset from said first modulation constellation, said respective phase offset being determined independently of said propagation environment.

11. The method of claim 10 wherein said respective phase offset is equal for each symbol of said second sequence of symbols.

12. The method of claim 10 wherein said respective phase offset is defined by a sequential set of phase offsets.

13. A method of transmitting from a transmitter having a first transmit antenna and a second transmit antenna, said method comprising:
transmitting a first sequence of symbols on said first transmit antenna, each symbol of said first sequence of symbols belonging to a first modulation constellation; and,
for each symbol of said first sequence of symbols,
simultaneously transmitting a symbol from a second sequence of symbols on said second transmit antenna, said second sequence of symbols independent of said first sequence of symbols and each symbol of said second sequence of symbols belonging to a respective modulation constellation having a respective phase offset from said first modulation constellation
wherein said respective phase offset is defined by a sequential set of phase offsets and said sequential set of phase offsets is {45 degrees, 135 degrees, 225 degrees, 315 degrees}.

14. The method of claim 10 further comprising selecting said respective phase offset from a set of phase offsets.

15. The method of claim 14 further comprising:
receiving an indication from a receiver; and
performing said selecting said respective phase offset based on said indication.

16. A transmitter in a propagation environment comprising:
a first transmit antenna;
a second transmit antenna;
a transmit processor adapted to:
cause transmission of a first sequence of symbols on said first transmit antenna, each symbol of said first sequence of symbols belonging to a first modulation constellation; and
for each symbol of said first sequence of symbols, cause simultaneous transmission of a symbol from a second sequence of symbols on said second transmit antenna, said second sequence of symbols independent of said first sequence of symbols and each symbol of said second sequence of symbols belonging to a respective modulation constellation having a respective phase offset from said first modulation constellation, said respective phase offset being determined independently of said propagation environment.

17. A method of transmitting from a transmitter having a first transmit antenna and a second transmit antenna, said method comprising:
transmitting a first symbol on said first transmit antenna, said first symbol belonging to a first modulation constellation; and
simultaneously transmitting a second symbol, independent of said first symbol, on said second transmit antenna, said second symbol belonging to a second modulation constellation, said second modulation constellation having a random phase offset from said first modulation constellation.

18. A transmitter comprising:
a first transmit antenna;
a second transmit antenna; and
a transmit processor adapted to:
cause transmission of a first symbol on said first transmit antenna, said first symbol belonging to a first modulation constellation; and
cause simultaneous transmission of a second symbol, independent of said first symbol, on said second transmit antenna, said second symbol belonging to a second modulation constellation, said second modulation constellation having a random phase offset from said first modulation constellation.

19. A method of transmitting a stream of data, said stream of data divided into a plurality of bit sequences, said method comprising:
based on a first bit sequence of said plurality of bit sequences, selecting a first symbol from a modulation constellation;
based on a second bit sequence of said plurality of bit sequences, selecting a second symbol from said modulation constellation;
rotating said second symbol through a random phase offset to give an offset second symbol;
transmitting said first symbol at a first transmit antenna; and
transmitting said offset second symbol at a second transmit antenna simultaneously with said transmitting said first symbol.

20. The method of claim 19 wherein a plurality of blocks of said stream of data are subject forward error correction coding.

21. The method of claim 20 wherein said random phase offset is distributed uniformly over each block of said plurality of blocks.

22. A transmitter comprising:
a mapper adapted to:
based on a first bit sequence in a stream of data, said stream of data divided into a plurality of bit sequences, select a first symbol from a modulation constellation;
based on a second bit sequence of said plurality of bit sequences, select a second symbol from said modulation constellation;
a phase adjuster adapted to rotate said second symbol through a random phase offset to give an offset second symbol;
a first transmit antenna adapted to transmit said first symbol; and
a second transmit antenna adapted to transmit said offset second symbol.

23. A transmitter comprising:
a mapper adapted to:
based on a first bit sequence in a stream of data, said stream of data divided into a plurality of bit sequences, select a first symbol from a first modulation constellation;
based on a second bit sequence of said plurality of bit sequences, select a second symbol, said second symbol belonging to a second modulation constellation, said
second modulation constellation having a random phase offset from said first modulation constellation;
a first transmit antenna adapted to transmit said first symbol; and
a second transmit antenna adapted to transmit said offset second symbol.

24. A method of receiving a composite signal, where said composite signal includes contributions from a first transmit antenna and a second transmit antenna, said method comprising:
determining an estimate of a first channel experienced by a signal from said first transmit antenna;
determining an estimate of a second channel experienced by a signal from said second transmit antenna;
rotating said estimate of said second channel through a random phase offset to give an offset estimate of said second channel; and
decoding said composite signal based on said estimate of said first channel and said offset estimate of said second channel.

25. A receiver comprising:
a channel estimation processor adapted to:
determine an estimate of a first channel experienced by a signal from a first transmit antenna;
determine an estimate of a second channel experienced by a signal from a second transmit antenna;
a phase adjuster adapted to rotate said estimate of said second channel through a random phase offset to give an offset estimate of said second channel; and
a decoder adapted to decode a composite signal based on said estimate of said first channel and said offset estimate of said second channel, where said composite signal includes contributions from said first transmit antenna and said second transmit antenna.

26. A method of transmitting from a transmitter, said transmitter having M transmit antennas, said method comprising:
- simultaneously transmitting a symbol, selected from a modulation constellation, on each of said M transmit antennas;
- wherein each of said symbols and said modulation constellations associated with one of said M transmit antennas are independent from each of said symbols and said modulations constellations associated with other of said M transmit antennas, and each of said modulation constellations having a phase offset of 90/M degrees from at least one other of said modulation constellations.

* * * * *

UNITED STATES PATENT AND TRADEMARK OFFICE
CERTIFICATE OF CORRECTION

PATENT NO. : 7,356,089 B2
APPLICATION NO. : 10/655012
DATED : April 8, 2008
INVENTOR(S) : Ming Jia et al.

It is certified that error appears in the above-identified patent and that said Letters Patent is hereby corrected as shown below:

Title Page

"Inventors: Ming Jia, Ottawa (CA); Peiying Zhu, Kanata (CA); Wen Tong, Ottawa (CA); Christian Dubuc, Alymer (CA)"

should be

-- Inventors: Ming Jia, Ottawa (CA); Peiying Zhu, Kanata (CA); Wen Tong, Ottawa (CA); Christian Dubuc, Alymer (CA); Timothy James Creasy, Manotick (CA) --

Signed and Sealed this

Eighth Day of July, 2008

JON W. DUDAS
*Director of the United States Patent and Trademark Office*